United States Patent [19]

Hartman

[11] 3,862,056

[45] Jan. 21, 1975

[54] SEMICONDUCTOR POLYMER COMPOSITIONS COMPRISING A GRAFTED BLOCK COPOLYMER OF SYNTHETIC RUBBER AND POLYOLEFIN AND CARBON BLACK

[75] Inventor: Paul F. Hartman, Wayne, N.J.

[73] Assignee: Allied Chemical Corporation, New York, N.Y.

[22] Filed: Dec. 20, 1972

[21] Appl. No.: 317,020

Related U.S. Application Data

[63] Continuation of Ser. No. 34,558, May 4, 1970, abandoned, which is a continuation-in-part of Ser. No. 780,165, Nov. 29, 1968, abandoned, which is a continuation-in-part of Ser. No. 690,758, Dec. 15, 1967, abandoned.

[52] U.S. Cl................. 252/511, 260/41, 260/41.5, 260/878
[51] Int. Cl..... H01b 1/06, C08c 11/18, C08f 15/04
[58] Field of Search..... 252/510, 511; 260/41, 41.5, 260/878 B

[56] References Cited

UNITED STATES PATENTS

| | | | |
|---|---|---|---|
| 2,597,741 | 5/1952 | Macey | 252/511 X |
| 3,639,163 | 2/1972 | Bishop et al. | 260/878 B |

FOREIGN PATENTS OR APPLICATIONS

| | | | |
|---|---|---|---|
| 1,010,197 | 11/1965 | Great Britain | 252/511 |
| 1,012,863 | 12/1965 | Great Britain | 252/511 |
| 828,233 | 2/1960 | Great Britain | 252/511 |
| 1,337,565 | 1963 | France | 252/511 |

Primary Examiner—Harvey E. Behrend
Assistant Examiner—R. E. Schafer
Attorney, Agent, or Firm—Michael S. Jarosz

[57] ABSTRACT

Semiconductive polymer compositions, useful as electrostatic shielding, comprise an electrically conductive filler, such as carbon black, in a polymer matrix comprising a polyolefin and a synthetic rubber.

9 Claims, No Drawings

3,862,056

SEMICONDUCTOR POLYMER COMPOSITIONS COMPRISING A GRAFTED BLOCK COPOLYMER OF SYNTHETIC RUBBER AND POLYOLEFIN AND CARBON BLACK

This application is a continuation of copending application Ser No. 34,558, filed May 4, 1970, which application is a continuation-in-part application of application Ser. No. 780,165 filed Nov. 29, 1968, abandoned, which application in turn is a continuation-in-part of application Ser. No. 690,758, filed Dec. 15, 1967, now abandoned.

BACKGROUND OF THE INVENTION

This invention relates to electrically semiconductive polymer compositions comprising an electrically conductive filler material, such as electrically conductive carbon black, in a polymer matrix comprising a polyolefin and a synthetic rubber.

Organic polymers are normally electrical insulators. For certain applications, however, such as to provide electrostatic shielding of power cables and other articles, it is desirable to utilize a polymer composition which is electrically semiconductive. It is known that certain polymers can be rendered semiconductive by incorporating therein a sufficient amount of an electrically conductive filler, such as electrically conductive carbon black. The two types of polymers most generally used are synthetic rubbers and polyethylene copolymers; however, even with these polymers more than 30% by weight of carbon black is normally required to obtain the desired degree of conductivity. (See J. E. Hager, *Semiconductive Polyolefin Compounds*, Modern Plastics 47(1), pp. 142-145, Jan. 1970.)

Semiconductive polymer compositions based on olefin polymers and containing in excess of 30% by weight carbon black are commercially available. These compositions are employed extensively as jacketing for power cables to provide electrostatic shielding. In such applications, however, the polymer compositions must not only be semiconductive, but most also have other requisite physical properties, particularly tensile properties. High loadings of carbon black tend to impair these physical properties, however, primarily by causing embrittlement. Other drawbacks of high loadings of carbon black include greater expense and greater sensitivity to moisture. Carbon black is notoriously hygroscopic and, as a result, the more carbon black a polymer composition contains, the more extensively it must be dried prior to extrusion to avoid surface imperfections and voids in the extruded product.

It is an object of this invention to provide improved semiconductive polymer compositions, particularly such compositions containing reduced amounts of carbon black.

SUMMARY OF THE INVENTION

We have discovered that polymer compositions comprising a grafted block copolymer of a polyolefin and a synthetic rubber can be rendered semiconductive by incorporating therein less than the normally required amount of electrically conductive filler. The compositions of this invention comprise an electrically conductive filler material in a polymer matrix comprising a grafted block copolymer of a polyolefin and a synthetic rubber, the electrically conductive filler being present in an amount of from about 5 to 19%, more preferably 10 to 19%, by volume based on the total volume of the filler and the polymer matrix. The polymer matrix preferably comprises from about 5 to 60 percent, preferably 20 to 60 percent, by weight of a synthetic rubber or blend of synthetic rubbers, and the balance of the polymer matrix is preferably a polyolefin or blend of polyolefins.

Suitable synthetic rubbers include neoprene (poly(2-chloro-1,3-butadiene), polyisoprene, polyisobutylene, polybutadiene, copolymers of butadiene and styrene containing 50 to 95% (preferably 60 to 85%) butadiene, copolymers of butadiene and acrylonitrile containing 40 to 95% (preferably 60 to 85%) butadiene, ethylene-propylene terpolymers (terpolymers of ethylene, propylene and a diolefin), and butyl rubber, which is produced by the copolymerization of an isoolefin having 4 to 7 carbon atoms (such as isobutylene) and a minor portion (generally 1-8%) of a conjugated diolefin having 4 to 8 carbon atoms (such as isoprene). These synthetic rubbers are all well known and are readily available commercially.

As used herein, the term "polyolefin" refers to polymers of compounds having the general formula $CH_2=CHR$ wherein R is hydrogen, chlorine, acetoxy, phenyl or alkyl radicals having 1 to 4 carbon atoms, and copolymers of such compounds with each other and with ethylenically unsaturated carboxylic acids and esters thereof having 3 to 6 carbon atoms in the acyloxy group and 1 to 6 carbon atoms in the ester group. Examples of suitable polyolefins include polyvinylchloride, polyvinylacetate, polystyrene, polyethylene, polypropylene, polybutene-1, poly(ethylene-acrylic acid), poly(ethylene-ethyl acrylate), and poly(ethylene-methyl methacrylate). The polyolefin component of the polymer matrix preferably comprises predominantly polyethylene, polypropylene, or polybutene-1. As used herein, the terms "polyethylene," "polypropylene," and "polybutene-1" include such polymers having from 0 to 3% by weight of ethylene, propylene, butene-1, pentene-1, or hexene-1 copolymerized therewith. More preferably, the polyolefin component of the polymer matrix is predominantly, preferably essentially only, polyethylene.

Particularly good results are obtained using grafted block copolymers of a synthetic rubber and a polyolefin selected from the group consisting of polyethylene, polypropylene, and polybutene-1. A method for preparing such block copolymers is disclosed in copending U.S. application Ser. No. 780,165 filed Nov. 29, 1968, the pertinent subject matter of which is incorporated herein by reference. Especially preferred are block copolymers of polyethylene and a synthetic rubber, with the synthetic rubber preferably being butyl rubber.

Grafted block copolymers of polyolefins and synthetic rubbers are prepared by mixing and heating a polyolefin such as polyethylene and a synthetic rubber such as butyl rubber in the presence of a bifunctional phenolic compound which acts as a grafting vehicle. The bifunctional phenolic compounds employed in the invention may be essentially either monomeric bifunctional phenols or polymeric bifunctional phenols, in either case having their functionality in the ortho positions with the para position substituted with an essentially inert substituent, such as alkyl, alkylaryl or arylalkyl radical of up to about 16 carbon atoms, preferably 4 to 12 carbon atoms. The more preferred phenolic compounds are the polymeric or so-called condensed bifunctional phenolic compounds. The ortho functionality of the suitable phenols is usually provided by a hydroxy or halogen substituent, the latter preferably being chlorine or bromine. The amount of the bifunctional phenol employed in the present invention may vary fairly widely between about 0.3% to 15% by total weight of the polyethylene and rubber to be grafted thereto, depending largely on the amount of rubber in the reaction mixture. The amount of the phenolic compound preferably is between about 1 to 8% by total weight of the substrate polymers. The grafting reaction itself is generally effected by heating the mixed components, desirably while maintaining mixing, to a temperature from about 250°F. to 425°F. In the more preferred embodiments the mixture is at the grafting temperature for between about 5 to 20 minutes.

Electrically conductive filler material suitable for use in this invention includes particulate material having a particle size ranging from 100 microns to 1 millimicron, preferably 10 microns to 10 millimicrons, and a volume resistivity of less than 0.01 ohm-cm. The filler material is preferably electrically conductive carbon black, but other electrically conductive materials, including finely-divided metals such as iron, copper, bronze, silver, etc., can also be used. Electrically conductive carbon black is a well known, commercially available material. It is usually produced by the decomposition of acetylene (acetylene black) or by the partial combustion of natural gas or liquid in insulated furnaces (furnace black). Electrically conductive carbon black suitable for use in this invention has a particle size in the range 10 to 180 millimicrons.

The proportion of electrically conductive filler present in the compositions of this invention is expressed on a volume basis because the various fillers which can be employed have widely varying densities. When carbon black is employed as filler in polymer compositions, however, it is customary to express the proportion of carbon black present in the composition on a weight basis. In the compositions of this invention, the proportion of carbon black present is preferably from 15 to 30%, more preferably 20 to 26%, by weight based on the total weight of the carbon black and the polymer matrix. In these ranges, the compositions of this invention have substantially greater electrical conductivity than compositions based on either the polyolefin or synthetic rubber component alone and containing the same amount of carbon black. This result is surprising because one would normally expect the degree of electrical conductivity of the two-polymer system to be simply an arithmetic average of the electrical conductivities of the one-polymer systems.

In containing less electrically conductive filler for a desired degree of conductivity, the compositions of this invention offer several advantages over other compositions. They are less costly to produce because the conductive filler is normally more expensive, especially on a volume basis, than the polymers employed. Furthermore, at lower filler loadings the compositions better retain their physical properties, particularly tensile strength, ultimate elongation, stress crack resistance, impact strength and low temperature brittleness point. With less filler, the compositions are also easier to process, having higher flow rates with less power consumption when extruded. Additional advantages include less moisture pickup, less sensitivity to shear history with better retention of conductivity, and less sensitivity to changes in conductivity due to changes in temperature.

The carbon black can be added either to the synthetic rubber before the rubber is combined with the polyolefin, or to the polymer matrix comprising the rubber and the polyolefin. when a copolymer of the synthetic rubber and the polyolefin is employed as the polymer matrix, the carbon black is added directly to the copolymer. The carbon black is added to the synthetic rubber or polymer matrix in accordance with methods known in the art, such as by simply milling a mixture of the carbon black and the polymer composition on a conventional rubber mill.

When filler other than carbon black is employed, it is preferably added to the synthetic rubber before the synthetic rubber is combined with the polyolefin component. After the filler is added to the synthetic rubber component (whether or not the filler is carbon black), the resultant mixture is then combined with the polyolefin component in accordance with conventional methods, such as by milling on a rubber mill.

The compositions of this invention can contain minor amounts of other thermoplastic resins as well as conventional polymer additives, such as antioxidants and other stabilizers, plasticizers, etc.

The compositions of this invention are useful as electrostatic shielding of electric power cables and other articles, such as explosives and conduits conveying flammable substances in potentially hazardous environments. In the case of power cables, conduits and similar articles, the compositions of this invention can be extruded as jacketing over the article to provide the desired electrostatic shielding.

The following examples further illustrate the invention.

EXAMPLE 1

Samples of a grafted block copolymer of polyethylene and butyl rubber were blended in a Brabender Plasti-Corder for various periods of time with various amounts of an electrically conductive carbon black available commercially from the Cabot Corporation under the trademark Vulcan XC-72. The copolymer was prepared by heating on a two-roll rubber mill a mixture of 75 parts by weight of the polyethylene, 25 parts by weight of the butyl rubber and about 2.5 parts by weight of a bifunctional phenolic resin comprising a normally solid brominated reaction product of p-methylphenol and formaldehyde, obtained commercially under the trademark SP-1055. The mixture was heated at 325°–350°F for about 3 minutes, then at 350°–400°F for about 2 minutes. The polyethylene had a density of 0.95, a melt index of 0.4, and contained about 2.0% butene-1 copolymerized therewith. The butyl rubber was a copolymer of about 98% isobutylene and 2% isoprene, had a density of 0.92, and was obtained under the trademark Enjay 268. The carbon black had an inherent density of about 1.8 and a particle size of about 29 millimicrons. After being blended with the carbon black, the samples were pressed into plaques from which 2-inch discs were cut for resistivity measurement. The surfaces of the discs were silver painted and a direct current of one volt was applied to the discs. The resistivity of each disc was determined using a Wheatstone bridge. The yield strength, ultimate tensile strength, and ultimate elongation of certain samples were determined in accordance with appropriate ASTM tests. The results are tabulated below:

| Percent Carbon Black | Mixing Time (min.) | Volume Resistivity (ohm-cm) | Yield Strength (psi) | Ultimate Tensile Strength(psi) | Ultimate Elongation (%) |
|---|---|---|---|---|---|
| 15 | 5 | 1720 | | | |
| do. | 20 | 3690 | | | |
| 20 | 10 | 19.4–21.0 | 2185 | 2133 | 140 |
| do. | 20 | 40.4 | 2136 | 2137 | 161 |
| 26 | 5 | 6.2–7.8 | | | |
| do. | 10 | 7.4–8.6 | 2408 | 2199 | 98 |
| do. | 20 | 8.8–10.1 | | | |
| do. | 40 | 10.0 | | | |

EXAMPLE 2

The procedure of Example 1 ws followed except the carbon black employed was obtained under the trademark Vulcan C. The tensile properties of the compositions were not determined. The results are tabulated below:

| Percent Carbon Black | Mixing Time (min.) | Volume Resistivity (ohm-cm) |
|---|---|---|
| 15 | 10 | $1.04 \times 10^8$ |
| 20 | 10 | 297 |

EXAMPLE 3

The procedure of Example 2 was followed except the carbon black employed was obtained under the trademark Vulcan SC. The results are tabulated below:

| Percent Carbon Black | Mixing Time (min.) | Volume Resistivity (ohm-cm) |
|---|---|---|
| 15 | 10 | $6.16 \times 10^4$ |
| 20 | 10 | 300 |

EXAMPLE 4

The procedure of Example 1 was followed except the grafted block copolymer was prepared using 50 parts by weight of the polyethylene, 50 parts by weight of the butyl rubber and 5 parts by weight of the phenolic grafting vehicle. The results are tabulated below:

| Percent Carbon Black | Mixing Time (min.) | Volume Resistivity (ohm-cm) | Yield Strength (psi) | Ultimate Tensile Strength(psi) | Ultimate Elongation (%) |
|---|---|---|---|---|---|
| 15 | 5 | 92 | | | |
| do. | 10 | 134–159 | No yield peak | 1908 | 200 |
| do. | 20 | 188 | | | |
| 20 | 10 | 17.8–19.9 | | | |
| 25 | 10 | 12.6 | | | |

EXAMPLE 5

The procedure of Example 1 was followed except the polyethylene employed was essentially an ethylene homopolymer having a density of 0.919 and a melt index of 1.0. The results are tabulated below:

| Percent Carbon Black | Mixing Time (min.) | Volume Resistivity (ohm-cm) | Yield Strength (psi) | Ultimate Tensile Strength(psi) | Ultimate Elongation (%) |
|---|---|---|---|---|---|
| 15 | 10 | 1120 | No yield peak | 1703 | 216 |
| 20 | 10 | 43.0 | | | |
| 26 | 10 | 13.2 | | | |
| do. | 20 | 19.5 | No yield peak | 1690 | 109 |

EXAMPLE 6

The procedure of Example 5 was followed except the copolymer was prepared using 50 parts by weight of the polyethylene, 50 parts by weight of the butyl rubber, and 5 parts by weight of the phenolic grafting vehicle. The results are tabulated below:

| Percent Carbon Black | Mixing Time (min.) | Volume Resistivity (ohm-cm) | Yield Strength (psi) | Ultimate Tensile Strength(psi) | Ultimate Elongation (%) |
|---|---|---|---|---|---|
| 15 | 10 | 1260 | No yield peak | 1457 | 228 |
| 20 | 10 | 9.27 | | | |
| do. | 20 | 94.0 | | | |
| 26 | 10 | 22.1 | | | |
| do. | 20 | 21.1 | No yield peak | 1341 | 108 |

EXAMPLE 7

The procedure of Example 4 was followed except the polyethylene and butyl rubber were present as a blend instead of a grafted block copolymer. The results are tabulated below:

| Percent Carbon Black | Mixing Time (min.) | Volume Resistivity (ohm-cm) | Yield Strength (psi) | Ultimate Tensile Strength(psi) | Ultimate Elongation (%) |
|---|---|---|---|---|---|
| 20 | 20 | 35.4 | 1023 | 906 | 68 |

When compared with Example 4 this Example demonstrates that better results are obtained when the polymer matrix is a grafted block copolymer rather than the corresponding physical blend.

EXAMPLE 8

The general procedure of Example 1 was followed except the carbon black was obtained under the trademark Vulcan SC and the polymer matrix consisted of a blend of about 66 parts by weight of the polyethylene and 34 parts by weight of polyisobutylene obtained under the trademark Vistanex. The tensile properties of the compositions were not determined. The results are tabulated below:

| Percent Carbon Black | Mixing Time (min.) | Volume Resistivity (ohm-cm) |
|---|---|---|
| 15 | 10 | 1070 |
| 20 | 10 | 65 |

COMPARATIVE EXAMPLE A

Except for the sample containing no carbon black, the procedure of Example 1 was followed using only the polyethylene instead of the block copolymer. The results are tabulated below:

| Percent Carbon Black | Mixing Time (min.) | Volume Resistivity (ohm-cm) | Yield Strength (psi) | Ultimate Tensile Strength(psi) | Ultimate Elongation (%) |
|---|---|---|---|---|---|
| 0 |    | >1.2 × 10$^{10}$ |      |       |      |
| 5  | 10 | >1.2 × 10$^{10}$ |      |       |      |
| 10 | 10 | >1.2 × 10$^{10}$ |      |       |      |
| 15 | 10 | ~1.2 × 10$^{10}$ | 4038 | Tears | <20  |
| 20 | 10 | 108              | 4004 | Tears | <19  |
| 30 | 10 | 10.2             |      |       |      |

The fact that the compositions of this Example tear when subjected to stress and have lower values for ultimate elongation indicates that these compositions are not as tough as the compositions of the invention. Accordingly, the compositions of the Example have lower stress crack resistance, less impact strength, and impaired low temperature brittleness point, which are important properties for compositions of this type.

COMPARATIVE EXAMPLE B

The volume resistivities of compositions consisting essentially of butyl rubber and various amounts of carbon black (Vulcan XC-72) are indicated in the table below:

| Percent Carbon Black | Volume Resistivity (ohm-cm) |
|---|---|
| 15 | 1 × 10$^5$ |
| 20 | 300 |
| 26 | 35 |

We claim:

1. An electrically semiconductive polymer composition comprising electrically conductive carbon black in a polymer matrix comprising a grafted block copolymer of a synthetic rubber and a polyolefin selected from the group consisting of polyethylene, polypropylene, and polybutene-1, said synthetic rubber being present in the copolymer in an amount of from about 5 to 60 percent by weight, and said carbon black being present in the composition in an amount of from about 20% to about 30% by weight, based on the total weight of the carbon black and the polymer matrix.

2. The composition of claim 1 wherein the synthetic rubber is selected from the group consisting of neoprene, polyisoprene, polyisobutylene, polybutadiene, butyl rubber, copolymers of butadiene and styrene containing 50 to 95% butadiene, and ethylene-propylene terpolymers.

3. The composition of claim 2 wherein the synthetic rubber is grafted to the polyolefin through a bifunctional phenolic material wherein the functional groups are hydroxy or halogen substituents in ortho positions.

4. The composition of claim 3 wherein the synthetic rubber is butyl rubber.

5. The composition of claim 3 wherein the polyolefin is polyethylene.

6. The composition of claim 5 wherein the synthetic rubber is butyl rubber.

7. The composition of claim 6 wherein the butyl rubber is present in the copolymer in an amount of from 20 to 60 percent by weight.

8. The composition of claim 7 wherein the carbon black is present in an amount of from about 20 to 26% by weight based on the total weight of the carbon black and the polymer matrix.

9. An electric power cable jacketed with the composition of claim 1.

* * * * *